(12) United States Patent
Saiki et al.

(10) Patent No.: US 9,226,033 B2
(45) Date of Patent: Dec. 29, 2015

(54) INFORMATION PROCESSING APPARATUS AND METHOD FOR PROVIDING INFORMATION

(75) Inventors: Kohji Saiki, Kawasaki (JP); Satoru Ishigaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 681 days.

(21) Appl. No.: 13/540,353

(22) Filed: Jul. 2, 2012

(65) Prior Publication Data

US 2013/0073638 A1    Mar. 21, 2013

(30) Foreign Application Priority Data

Sep. 15, 2011    (JP) ................. 2011-201928

(51) Int. Cl.
| | |
|---|---|
| *H04H 60/33* | (2008.01) |
| *H04N 21/47* | (2011.01) |
| *H04N 21/4788* | (2011.01) |
| *H04N 21/258* | (2011.01) |
| *H04H 60/65* | (2008.01) |
| *H04L 12/58* | (2006.01) |
| *H04N 21/475* | (2011.01) |
| *H04N 21/84* | (2011.01) |

(52) U.S. Cl.
CPC ............. *H04N 21/47* (2013.01); *H04H 60/33* (2013.01); *H04H 60/65* (2013.01); *H04N 21/25891* (2013.01); *H04N 21/4788* (2013.01); *H04L 51/08* (2013.01); *H04N 21/4756* (2013.01); *H04N 21/84* (2013.01)

(58) Field of Classification Search
CPC .. G06F 17/30861; H04N 21/45; H04N 21/24; H04N 51/4788; H04N 21/4756; H04N 21/47; H04L 12/588; H04L 51/08; H04L 12/582; H04H 60/33; H04H 60/65

See application file for complete search history.

(56) References Cited

U.S. PATENT DOCUMENTS

| | | | |
|---|---|---|---|
| 8,838,564 B2* | 9/2014 | Sahni et al. ................ | 707/706 |
| 8,930,204 B1* | 1/2015 | Igoe et al. .................. | 705/2 |
| 2002/0044218 A1* | 4/2002 | Mitts et al. ................ | 348/465 |
| 2009/0055736 A1* | 2/2009 | Yoon .......................... | 715/700 |
| 2013/0031088 A1* | 1/2013 | Srikrishna et al. ......... | 707/722 |
| 2014/0259070 A1* | 9/2014 | Angiolillo et al. ........ | 725/44 |

FOREIGN PATENT DOCUMENTS

| | | | |
|---|---|---|---|
| GB | 2479947 A | * | 11/2011 |
| JP | 2001048445 A | * | 2/2001 |

(Continued)

OTHER PUBLICATIONS

Office Action dated Sep. 25, 2012 of corresponding Japanese Patent Application 2011-201928—6 pages.

*Primary Examiner* — Uzma Alam

(74) *Attorney, Agent, or Firm* — Knobbe, Martens, Olson & Bear, LLP

(57) ABSTRACT

According to one embodiment, an information processing apparatus receives, from a site on Internet, first messages related to a first broadcast station and posted on the site. The apparatus scores each of the received first messages based on a number of characters in each of the received first messages so as to give a higher score to first messages each with a smaller number of characters, and calculates a first evaluation value for content data being broadcast by the first broadcast station based on the scores for the received first messages. The apparatus transmits the calculated first evaluation value to a user terminal.

12 Claims, 12 Drawing Sheets

(56) References Cited

FOREIGN PATENT DOCUMENTS

| JP | 2002-290996 | | 10/2002 |
|---|---|---|---|
| JP | 2002290996 A | * | 10/2002 |
| JP | 2004-015087 | | 1/2004 |
| JP | 2006-277386 A | | 10/2006 |
| JP | 2008244602 A | * | 10/2008 |
| JP | 2009-211280 A | | 9/2009 |
| JP | 2009-212630 A | | 9/2009 |
| JP | 2011-048445 | | 3/2011 |

* cited by examiner

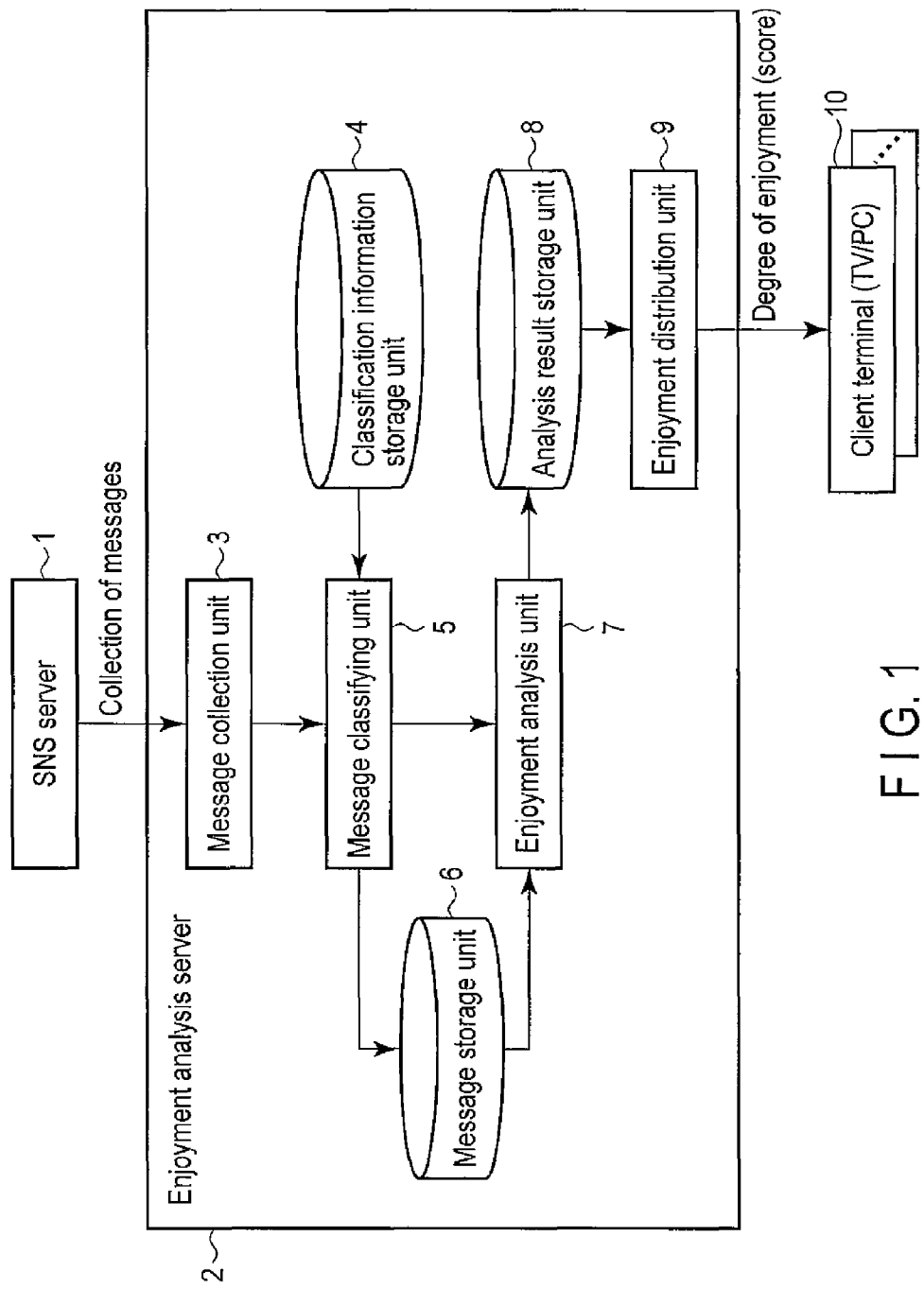
F I G. 1

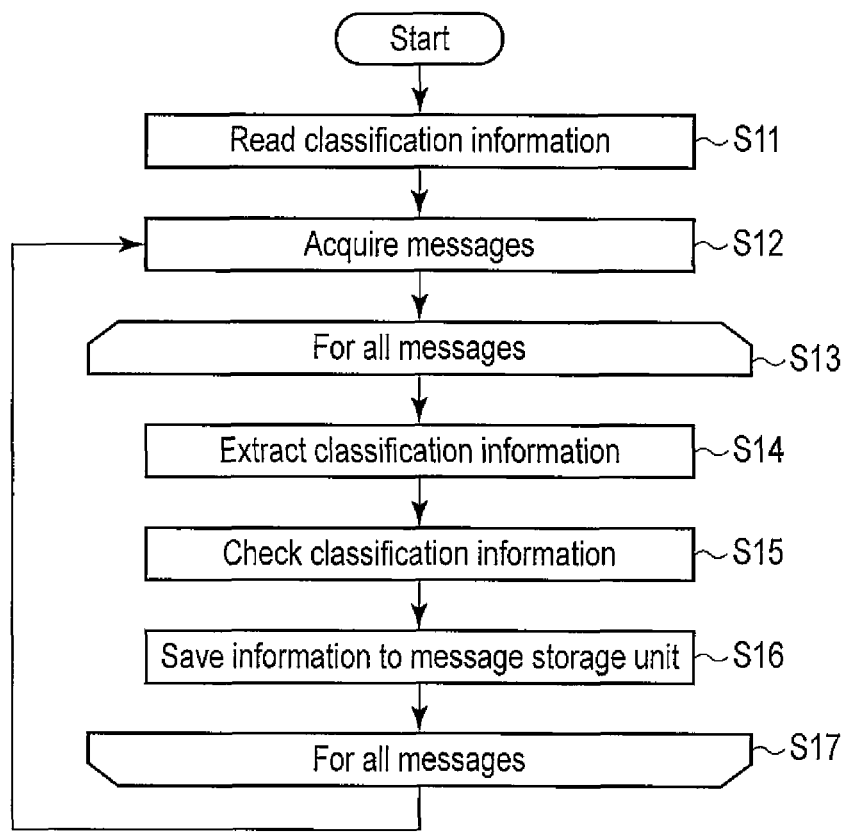
F I G. 2

Classification information

| Network ID (broadcast station ID) | Hash tag |
|---|---|
| 10 | AAA |
| 11 | BBB |
| 12 | CCC |
| ⋮ | ⋮ |

FIG. 4

Classification result information

| Network ID (broadcast station ID) | Contents of messages |
|---|---|
| 10 | XXXXXXXXXXXXXXXX |
| 10 | XXXXXX,XXXXXX,XXX |
| 11 | XXXXXXXXXXXXXXXX |
| 12 | XXXXXX,XXXXXX,XXX |
| ⋮ | ⋮ |

FIG. 5

Analysis result information
| Network ID (broadcast station ID) | Score | Number of messages |
|---|---|---|
| 11 | 120 | 1 |
| 12 | 10050 | 1000 |
| 13 | 1000 | 30 |
| 14 | 500 | 30 |
| 15 | 10 | 1 |
| ⋮ | ⋮ | ⋮ |
Target data for output — Internal data
F I G. 6
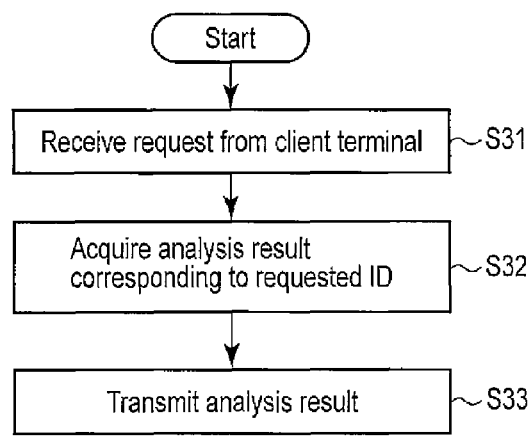
F I G. 7

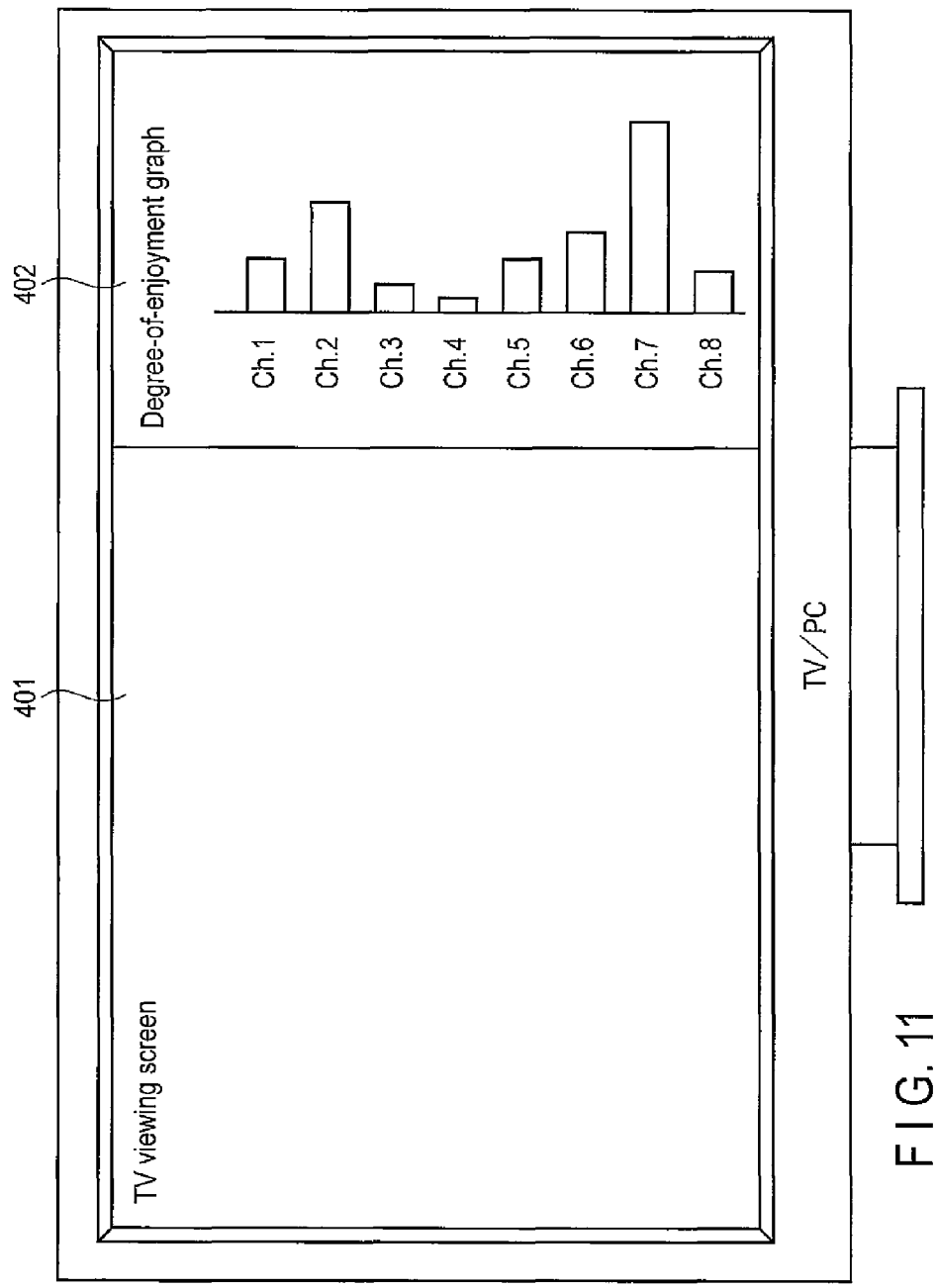
F I G. 11

INFORMATION PROCESSING APPARATUS AND METHOD FOR PROVIDING INFORMATION

CROSS-REFERENCE TO RELATED APPLICATIONS

This application is based upon and claims the benefit of priority from prior Japanese Patent Application No. 2011-201928, filed Sep. 15, 2011, the entire contents of which are incorporated herein by reference.

FIELD

Embodiments described herein relate generally to an information processing apparatus configured to provide information about content data being broadcast, and a method for providing information.

BACKGROUND

In recent years, various broadcast services such as television broadcasting and Internet broadcasting have become widely available. In these broadcast services, individual broadcast stations sequentially broadcast a large number of content data (program data) in an order according to a broadcast schedule. Viewers can select one of a large number of broadcast stations which is broadcasting program data in which the viewer takes an interest, that is, one of a large number of channels on which the program data is being broadcast.

An electronic program guide (EPG) is known as a technique to provide information about programs to viewers.

Moreover, techniques have started to be developed which involve counting the numbers of messages posted on a site on the Internet and transmitting the results of evaluation of the programs based on the numbers, to the viewers' terminals.

However, the method of evaluating the programs using the numbers of messages is based on the assumption that the number of messages vary significantly depending on the contents of the programs. When the numbers of messages do not substantially vary, the viewers' reactions may fail to be reflected in the results of evaluation.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram illustrating a system configuration for an information processing apparatus according to an embodiment;

FIG. 2 is an exemplary flowchart illustrating a procedure for a message collection process and a message classifying process both executed by an information processing apparatus according to the embodiment;

FIG. 4 is an exemplary diagram illustrating classification information pre-stored in a classification information storage unit of the information processing apparatus according to the embodiment;

FIG. 5 is an exemplary diagram illustrating classification result information stored in a classification result storage unit of the information processing apparatus according to the embodiment;

FIG. 6 is an exemplary diagram illustrating analysis result information stored in an analysis result storage unit of the information processing apparatus according to the embodiment;

FIG. 7 is an exemplary flowchart illustrating a procedure for an analysis result transmitting process executed by the information processing apparatus according to the embodiment;

FIG. 11 is a diagram illustrating another example of the display screen of the client terminal in FIG. 9;

DETAILED DESCRIPTION

Figure 3:
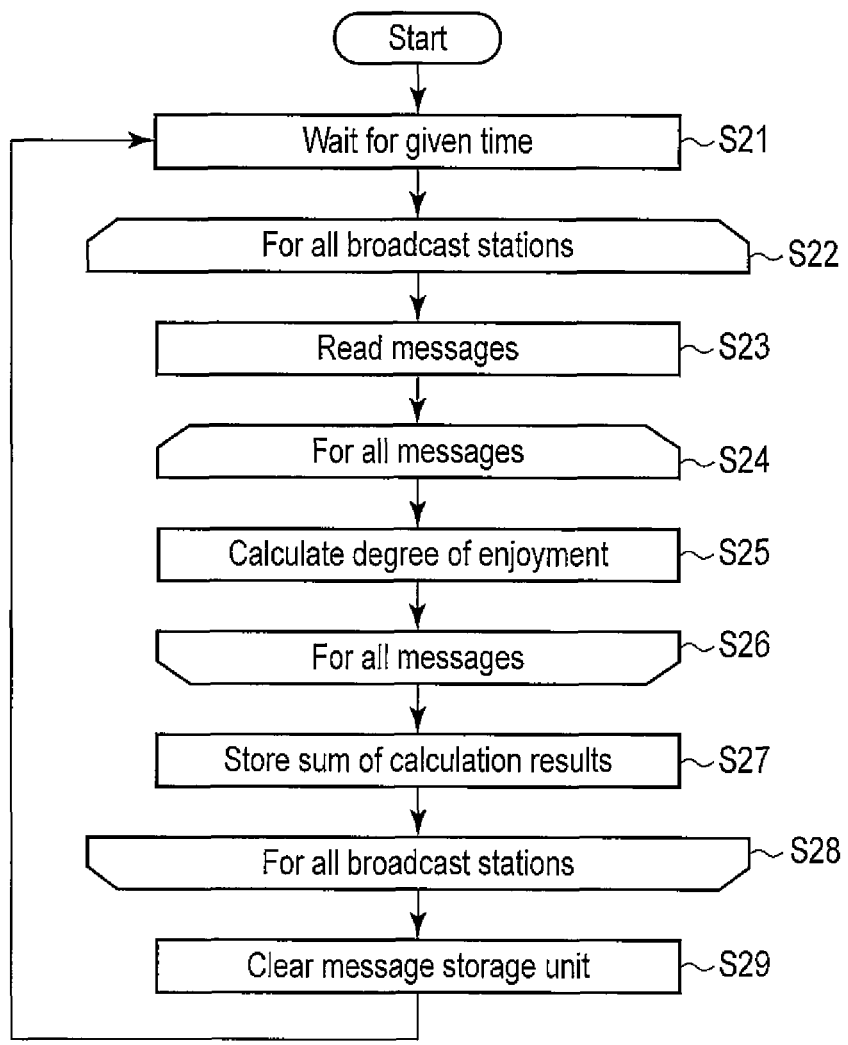
FIG. 3 is an exemplary flowchart illustrating a procedure for a message analysis process executed by the information processing apparatus according to the embodiment.

Various embodiments will be described hereinafter with reference to the accompanying drawings.

In general, according to one embodiment, an information processing apparatus comprises a reception module, a calculation module, and a transmission module. The reception module receives, from a site on Internet, first messages related to a first broadcast station and posted on the site. The calculation module scores each of the received first messages based on a number of characters in each of the received first messages so as to give a higher score to first messages each with a smaller number of characters, and calculates a first evaluation value for content data being broadcast by the first broadcast station based on the scores for the received first messages. The transmission module transmits the calculated first evaluation value to a user terminal.

First, with reference to FIG. 1, a configuration of an information processing apparatus according to an embodiment will be described. The information processing apparatus has a function to feed viewers' reactions to individual program data being broadcast, back to the viewers in real time (enjoyment analysis function). The information processing apparatus is implemented as a server computer. The server computer functions as an enjoyment analysis server 2 for carrying out the enjoyment analysis function.

The enjoyment analysis server 2 is configured to communicate with a social networking service (SNS) server 1 via the Internet. SNS is a site for supporting communications (conversational activities) between individuals, and provides services, for example, mini blogs and Twitter (registered trademark).

The enjoyment analysis server 2 analyzes a plurality of sets of messages in real time which relate to the respective broadcast stations providing broadcast services (for example, TV broadcasting and Internet broadcasting). The analysis process is executed to calculate the degree of enjoyment on SNS for program data currently being broadcast by the broadcast stations.

An analysis process for a certain broadcast station is executed on a set of messages about the broadcast station posted on an SNS site (SNS server 1). First, the enjoyment analysis server 2 communicates with the SNS server 1 to receive a set of messages about a certain broadcast station posted on the SNS server 1. Then, in order to allow a higher score (mark) to be given to messages each with a smaller number of characters, the enjoyment analysis server 2 counts the number of characters in each of the messages and calculates the difference between a predetermined upper limit on the number of characters and the number of characters in each message. The upper limit on the number of characters is the upper limit value of the number of characters in a message that can be posted on the SNS site, that is, the upper limit value of the number of characters specified by the SNS. The total of the differences calculated for the respective messages related to the same broadcast station is calculated to be a score (mark) indicative of the degree of enjoyment of the program data currently being broadcast by the broadcast station. The degree of enjoyment is an evaluation value indicative of the degree of viewers' reactions to the contents of the program data being broadcast. The enjoyment analysis server 2 transmits the calculated degree of enjoyment to each client terminal 10.

Messages posted on the SNS site for the program data (content data) being broadcast have the following tendency.

A message with a shorter sentence tends to have a stronger association with the most recent or current scene in the program data being broadcast. A message with a longer sentence tends to have a weaker association with the most recent or current scene in the program data but to contain a topic about a previously broadcast scene or another content. That is, a message with a smaller number of characters can be considered to be posted impulsively and emotionally (the message directly expresses the impression and impact made on the viewer when the viewer watches the most recent or current scene in the program data).

The present embodiment enables calculation of an evaluation value indicative of "how many messages are impulsively and emotionally posted for the program data being broadcast" by giving a higher score to messages each with a smaller number of characters.

If a method is adopted in which the evaluation value is calculated using only the number of messages, the evaluation value can only indicate "how energetically the viewers posted messages on the SNS site". The present embodiment enables expression of how many messages are posted on the SNS site in real time (that is, how emotionally and impulsively messages were posted on the SNS site) by giving a higher score to messages each with a smaller number of characters. Thus, even if the total number of messages is small, the viewers' reactions to the content data being broadcast can be sufficiently reflected in the evaluation value.

The enjoyment analysis server 2 comprises a message collection unit 3, a classification information storage unit 4, a message classifying unit 5, a message storage unit 6, an enjoyment analysis unit 7, an analysis result storage unit 8, and an enjoyment distribution unit 9. The message collection unit 3, the classification information storage unit 4, and the message classifying unit 5 are functional modules for collecting and classifying messages posted on the SNS site. The enjoyment analysis module 7 and the analysis result storage unit 8 are functional modules for analyzing the messages. The enjoyment distribution unit 9 is a functional module configured to transmit the results of analysis to each client terminal 10. Information shared between these functional modules is saved to the message storage unit 6 and the analysis result storage unit 8.

The message collection unit 3 communicates with the SNS site (SNS server 1) via the Internet to collect, from the SNS site, messages related to the target broadcast station for analysis and posted on the SNS site. For example, the message collection unit 3 may transmit a search request containing identifiers indicative of several target broadcast stations for analysis (the network IDs of the target broadcast stations for analysis, strings indicative of hash tags for the target broadcast stations for analysis, or the like) to the SNS server 1, and thus receive each of messages related to the target broadcast stations for analysis and newly posted on the SNS server 1, from the SNS server 1 in real time. Of course, the message collection unit 3 may periodically access the SNS server 1 and collect at least one of the latest messages related to the target broadcast stations for analysis, from the SNS server 1. In the present embodiment, each of a plurality of predetermined broadcast stations is handled as a target broadcast station for analysis. Thus, the message collection unit 3 collects (receives) messages related to each of the plurality of broadcast stations, from the SNS server 1.

The message classifying unit 5 classifies messages collected by the message collection unit 3 by the broadcast station. The classification process is executed based on classification information stored in the classification information storage unit 4. As the classification information, strings (hash tags) allowing the respective broadcast stations to be identified are stored. Messages corresponding to a certain broadcast station contain a string (hash tag) allowing the broadcast station to be identified. Thus, the message classifying unit 5 can classify each of the messages into one of a plurality of groups corresponding to the respective broadcast stations based on the string (hash tag) in the message. The messages classified into the groups corresponding to the broadcast stations are stored in the message storage unit 6.

The enjoyment analysis unit 7 repeatedly executes the above-described analysis process at predetermined time intervals to calculate the current degrees of enjoyment corresponding to the individual broadcast stations, for example, on a minute-by-minute basis. In the process of analyzing messages related to a first broadcast station, the enjoyment analysis unit 7 scores each of the messages related to the first broadcast station, based on the number of characters in each of the messages so as to give a higher score to messages each with a smaller number of characters. The enjoyment analysis unit 7 calculates an evaluation value (the degree of enjoyment) for content data being broadcast by the first broadcasting station based on the score of each of the messages. The calculated evaluation value is stored in the analysis result storage unit 8.

The enjoyment distribution unit 9 communicates with each client terminal 10 via a network such as the Internet. The client terminal 10 is a terminal (user terminal) used by a user. The enjoyment distribution unit 9 acquires the degree of enjoyment for each of at least one broadcast station requested by a certain client terminal 10, from the analysis result storage unit 8, and transmits the degree of enjoyment to the client terminal 10 in association with the identifier of the broadcast station. Alternatively, the enjoyment distribution unit 9 may transmit not only the degree of enjoyment but also the messages related to each of the at least one broadcast station, to the client terminal 10.

Now, procedures for a message collection process and a message classifying process both executed by the enjoyment analysis server 2 will be described with reference to a flowchart in FIG. 2.

The document classifying unit 5 reads the classification information required to classify the messages, from the classification information storage unit 4 (step S11). As shown in FIG. 4, a correspondence table showing hash tags (strings each starting with "#" and indicating a category of messages) and the identifiers (network IDs) of the broadcast stations is pre-stored in the classification information storage unit 4 as classification information. A hash tag corresponding to a certain broadcast station is inserted into a message for a program of the broadcast station. The hash tag corresponding to each broadcast station is, for example, the name or abbreviated name of the broadcast station. In step S11, the message classifying unit 5 reads in the correspondence table in FIG. 4, that is, the identifier (network ID) of each broadcast station and the hash tag corresponding to the identifier (network ID), from the classification information storage unit 4.

The message collection unit 3 acquires at least one message related to a target broadcast station for the analysis process, from the SNS server 1 using an HTTP protocol or the like (step S12). In step S12, for example, the message collection unit 3 collects messages each containing any one of the hash tags corresponding to the respective target broadcast stations for the analysis process.

The message classifying unit 5 executes the following processing on all the messages collected by the message collection unit 3 (steps S13 to S17).

Step S13 corresponds to the first portion of a loop process comprising steps S13 to S17. Step S13 indicates that the processing in steps S14 and S15 is repeated until the processing is completed on all the collected messages.

The message classifying unit 5 extracts a portion (=hash tag) which is enclosed between "#" and a space, from each target message for processing (step S14). The message classifying unit 5 checks the extracted hash tag against the classification information read in step S11, and acquires the identifier of the broadcast station corresponding to the extracted hash tag, from the classification information (step S15). The message classifying unit 5 classifies the target message for processing into the group corresponding to the network ID acquired, and saves the target message for processing and the network ID to the message storage unit 6 in association with each other (step S16). The message classifying unit 5 then proceeds to step S17. In step S17, the message classifying unit 5 determines whether or not the classifying processing is completed on all the collected messages. If the classifying processing has not been completed on any of the messages, the message classifying unit 5 returns to the processing in step S13 and changes the target message for processing to another message. The message classifying unit 5 then executes the processing in steps S14 and S15 again. Thus, all the collected messages are classified into the plurality of groups corresponding to the respective broadcast stations.

FIG. 5 shows an example of information (classification result information) stored in the message storage unit 6. As shown in FIG. 5, in the message storage unit 6, for each of the collected messages, a string (text) indicative of the contents of the message and the network ID of the broadcast station related to the message are stored.

Now, a procedure for a message analysis process executed by the enjoyment analysis server 2 in FIG. 3 will be described with reference to a flowchart in FIG. 3.

The enjoyment analysis unit 7 waits for a given time before starting the process (step S21). This is to wait for the messages posted on the SNS server 1 during the given time to be accumulated in the message storage unit 6. The enjoyment analysis unit 7 executes the analysis process on the set of messages posted on the SNS server 1 during the given time. The given time is, for example, one minute. The process of analyzing the set of messages posted on the SNS server 1 is repeatedly executed at intervals of one minute. Each analysis process is executed on the set of messages posted on the SNS server 1 during one minute immediately before the beginning of the analysis.

The enjoyment analysis unit 7 executes the following process on each of the sets of messages corresponding to all the broadcast stations (steps S22 to S28). Step S22 corresponds to the first portion of a loop process comprising steps S22 to S28. Step S22 indicates that the processing in steps S23 to S27 is repeated until the processing is completed on all the broadcast stations. The loop process comprising steps S22 to S28 incorporates a small loop process comprising steps S24 to S26. Step S24 corresponds to the first portion of the small loop process. Step S24 indicates that the processing in step S25 is repeated until the score (the degree of enjoyment) is calculated for all the messages related to the target broadcast station for processing.

Now, it is assumed that a set of messages corresponding to a broadcast station A is analyzed. The enjoyment analysis unit 7 reads all the messages related to the identifier (network ID) of the broadcast station A from the message storage unit 6 (step S23). The enjoyment analysis unit 7 executes the following process on all the read messages (steps S24 to S26). The enjoyment analysis unit 7 obtains the difference between an upper limit value MAX for the number of characters that can be posted (for example, MAX=140 characters) and the number of characters in a target message for processing (step S25). The difference is indicative of a score to be given to the target message for processing. The enjoyment analysis unit 7 proceeds to step S26. In step S26, the enjoyment analysis unit 7 determines whether or not the processing is completed on all the messages related to the target broadcast station A for processing. If the processing has failed to be completed on any message, the enjoyment analysis unit 7 returns to step S24 to change the target message for processing to another message and executes the difference calculating process in step S25 again. Thus, all the messages related to the target broadcast station A for processing are each given a score.

Now, it is assumed that all the messages related to the target broadcast station A for processing are n messages A1 to An.

The enjoyment analysis unit 7 determines the difference between the upper limit value MAX of the number of characters that can be posted (for example, MAX=140 characters) and the number of characters in each of the messages A1 to An (step S25). When the numbers of characters in the messages A1 to An are denoted by C1 to Cn, respectively, the enjoyment analysis unit 7 determines:

the difference between the upper limit value of the number of characters and the number of characters C1 in the message A1: 140−C1, the difference between the upper limit value of the number of characters and the number of characters C2 in the message A2: 140−C2, and the difference between the upper limit value of the number of characters and the number of characters Cn in the message An: 140−Cn.

When all the messages related to the target broadcast station A for processing are scored, the enjoyment analysis unit 7 proceeds to step S27. In step S27, the enjoyment analysis unit 7 calculates the sum SUM(a) of the differences corresponding to all the messages related to the target broadcast station A for processing, that is, the messages A1 to An. The sum SUM(a) is expressed as follows.

$$SUM(a)=(140-C1)+(140-C2)+,\ldots,+(140-Cn)$$

The enjoyment analysis unit 7 saves the calculated sum SUM(a) to the analysis result storage unit 8 as an analysis result for the set of messages related to the broadcast station A (step S27). The sum SUM(a) is a score (mark) for the set of messages corresponding to the broadcast station A.

If the calculation of the evaluation value for the set of messages corresponding to the broadcast station A is completed, the enjoyment analysis unit 7 proceeds to step S28. In step S28, the enjoyment analysis unit 7 determines whether or not the calculation of an evaluation value has been completed on the sets of messages corresponding to all the broadcast stations. If the calculation of an evaluation value has failed to be completed on the sets of messages corresponding all the broadcast stations, the enjoyment analysis unit 7 returns to the processing in step S22 to change the target broadcast station for processing to another broadcast station, and executes the processing in steps S23 to S27 again.

The processing is carried out as described above, and the enjoyment analysis unit 7 calculates the above-described sums SUM for all the broadcast stations and saves the calculated sums SUM to the analysis result storage unit 8 (step S27). The enjoyment analysis unit 7 then clears the contents of the message storage unit 6 (step S29).

FIG. 6 illustrates an example of analysis result information saved to the analysis result storage unit 8. For each network ID, the score for the set of messages (value SUM) and the number of messages contained in the set of messages are saved to the analysis result storage unit 8. The number of messages is not transmitted to the client terminal 10. Thus, the number of messages need not be saved to the analysis result storage unit 8. For example, the number of messages related to a broadcast station with a network ID of 13 is 30, and the number of messages related to a broadcast station with a network ID of 14 is 30. However, the score for the set of messages related to the broadcast station with a network ID of 13 is 1,000, which is much higher than the score for the set of messages related to the broadcast station with a network ID of 14, 500. This means that the set of messages related to the broadcast station with a network ID of 13 contains relatively many messages with a smaller number of characters.

As described above, the present embodiment calculates the difference between the upper limit value of the number of characters that can be posted and the number of characters in each message, and uses the sum of the calculated differences as a score for the set of messages. Thus, how many messages are more impulsively posted for program data being broadcast can be presented to each viewer as a score. Moreover, the use of the sum of the differences as an evaluation value enables the degree of enjoyment on SNS to be expressed even with a small number of messages.

Instead of the difference between the upper limit value of the number of characters and the number of characters in each message, the ratio of the upper limit value MAX of the number of characters to the number of characters in the message (=MAX÷Cn) may be determined so that the average of the ratios for the messages can be determined to be the degree of enjoyment. The average of the ratios is given by ((MAX÷C1)+(MAX÷C2)+ . . . +(MAX÷Cn))÷n.

The use of the average of the ratios as described above allows calculated evaluation values to be normalized so as to fall within a given range. This allows the user to easily compare the evaluation values corresponding to the respective channels with one another.

Now, a procedure for an analysis result transmitting process executed by the enjoyment analysis server 2 will be described with reference to a flowchart in FIG. 7.

The enjoyment distribution unit 9 receives an HTTP request from the client terminal 10 (step S31). The HTTP request requests the enjoyment analysis server 2 to distribute the degree of enjoyment. The enjoyment distribution unit 9 acquires the degrees of enjoyment (scores) corresponding to all the broadcast stations specified by the HTTP request, from the analysis result storage unit 8 (step S32). The enjoyment distribution unit 9 transmits the acquired degrees of enjoyment (scores) to the client terminal 10 via the Internet or the like (step S33). Alternatively, every time the degree of enjoyment for each broadcast station corresponding to the latest time is calculated, the enjoyment distribution unit 9 may automatically transmit the degree of enjoyment to each client terminal 10 having requested the distribution.

Figure 8:
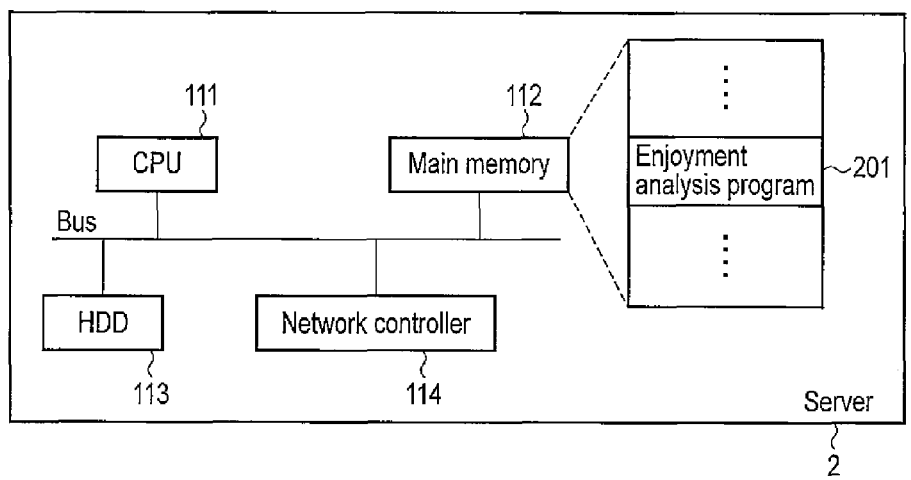
FIG. 8 is an exemplary block diagram illustrating a configuration of the information processing apparatus according to the embodiment.

FIG. 8 shows an exemplary hardware configuration of the enjoyment analysis server 2. The enjoyment analysis server 2 comprises a CPU 111, a main memory 112, a hard disk drive (HDD) 113, and a network controller 114. CPU 111 is a processor that executes various programs, which are loaded from the hard disk drive (HDD) 113 into the main memory 112. The programs include an enjoyment analysis program 201. The enjoyment analysis program 201 is adapted to perform a service for distributing the above-described degree of enjoyment to each client terminal 10. The enjoyment analysis program 201 can carry out procedures described with reference to the flowcharts in FIG. 2, FIG. 3, and FIG. 7.

Figure 9:
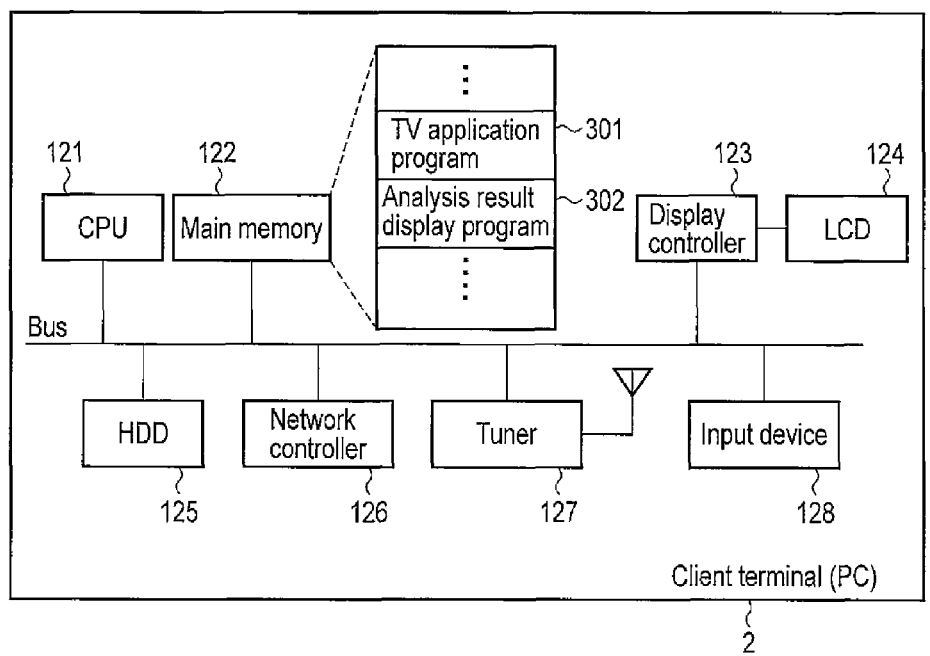
FIG. 9 is an exemplary block diagram illustrating a configuration of a client terminal serviced by the information processing apparatus according to the embodiment.

FIG. 9 shows an exemplary hardware configuration of the client terminal 10. The client terminal 10 is implemented as a personal computer (PC) or a television (TV). FIG. 9 shows a configuration of PC functioning as the client terminal 10. The client terminal 10 comprises CPU 121, a main memory 122, a display controller 123, a display 124 such as a liquid crystal device (LCD), a hard disk drive (HDD) 125, a network controller 126, a TV tuner 127, and an input device 128.

CPU 121 is a processor that executes various programs loaded from HDD 125 into the main memory 122. The programs include a TV application program 301 and an analysis result display program 302. The TV application program 301 controls the TV tuner 127 to playback program data in a TV broadcast signal received by the TV tuner 127. The analysis result display program 302 communicates with the enjoyment analysis server 2 via the network controller 126. The analysis result display program 302 may be software incorporated in the TV application program 301. The analysis result display program 302 is started in response to the user's operation of the input device 128. The input device 128 is implemented as a keyboard, a pointing device, or a voice input interface with a speech recognition function mounted therein.

The analysis result display program 302 executes a request process of requesting the enjoyment analysis server 2 to distribute the degree of enjoyment, a reception process of receiving analysis results (the degree of enjoyment for at least one broadcast station) from the enjoyment analysis server 2, a display control process of displaying the degree of enjoyment on a screen of the display 124, and the like. In the request process, the analysis result display program 302 transmits the above-described HTTP request specifying the identifier (network ID) of at least one broadcast station, to the enjoyment analysis server 2. In this case, the analysis result display program 302 may transmit an HTTP request specifying the identifiers (network IDs) of all the broadcast stations that can be received by the TV tuner 127 or an HTTP request specifying the identifiers (network IDs) of some broadcast stations selected by the user.

Now, several display screens of the client terminal 10 will be described with reference to FIG. 10 to FIG. 15.

Figure 10:
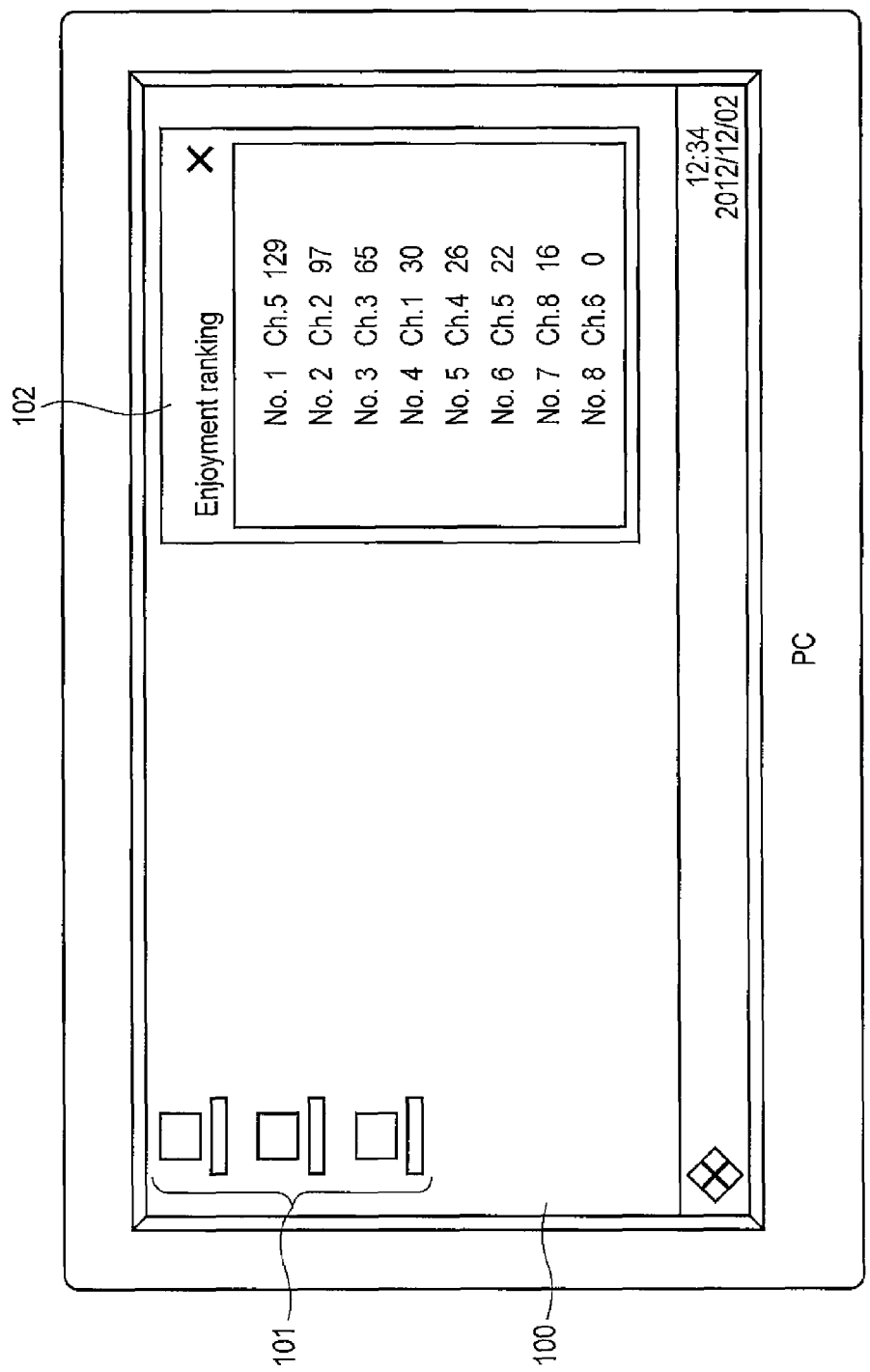
FIG. 10 is a diagram illustrating an example of a display screen of the client terminal in FIG. 9.

FIG. 10 is a first display screen example. The first display screen example is applied to PC shown in FIG. 9. Several icons 101 are displayed on a desktop screen 100 of PC. The icons 101 include one for starting the analysis result display program 302. When this icon is clicked by the user, the analysis result display program 302 is started. The analysis result display program 302 transmits the above-described HTTP request to the enjoyment analysis server 2. Based on analysis result information received from the enjoyment analysis server 2, the analysis result display program 302 then displays an enjoyment ranking list 102 on the desktop screen 100.

The enjoyment ranking list 102 displays a list of the scores for the broadcast stations (channels) arranged in order of decreasing score. Here, the score for each broadcast station is an evaluation value (the degree of enjoyment) calculated by the above-described enjoyment analysis unit 7. By looking at the enjoyment ranking list 102, the user can know channels with higher degrees of enjoyment. The enjoyment ranking list 102 functions as information for assisting the user in selecting the channel.

FIG. 11 is a second display screen example. The second display screen example is applied to PC or TV. In FIG. 11, a TV viewing screen 401 and a degree-of-enjoyment graph 402 are displayed side by side on the display screen of PC or TV. The TV viewing screen 401 displays the video of a broadcast program being received. The degree-of-enjoyment graph 402 is a bar graph showing the scores (the degrees of enjoyment) for the respective channels.

Figure 12:
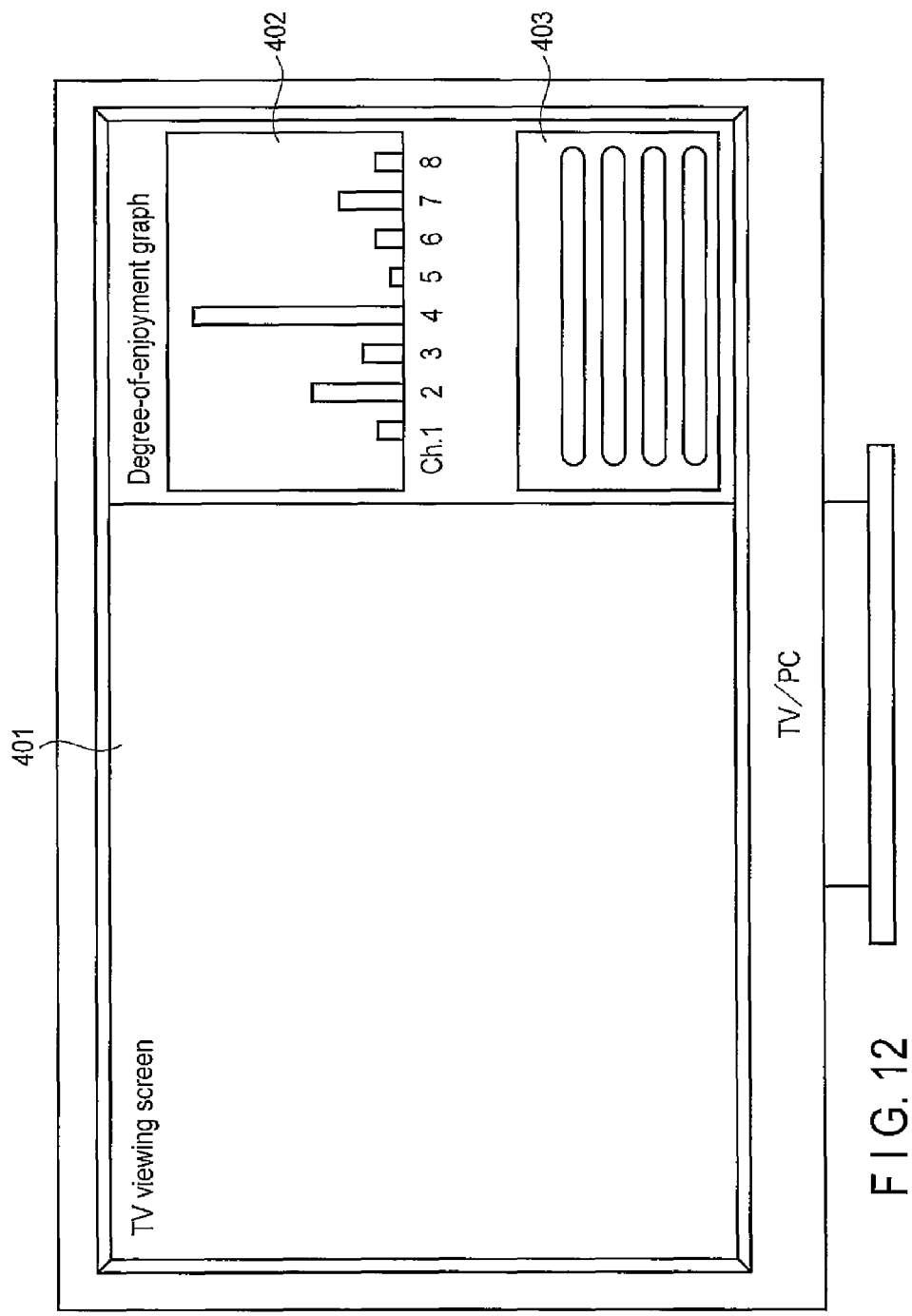
FIG. 12 is a diagram illustrating yet another example of the display screen of the client terminal in FIG. 9.

FIG. 12 is a third display screen example. The third display screen example is applied to PC or TV. In FIG. 12, the TV viewing screen 401 and the degree-of-enjoyment graph 402 are displayed side by side on the display screen of PC or TV. A message list 403 is further displayed on the display screen. The message list 403 displays the contents of several most recent messages related to a channel being currently viewed (the channel with the video of a program being displayed on the TV viewing screen 401).

Figure 13:
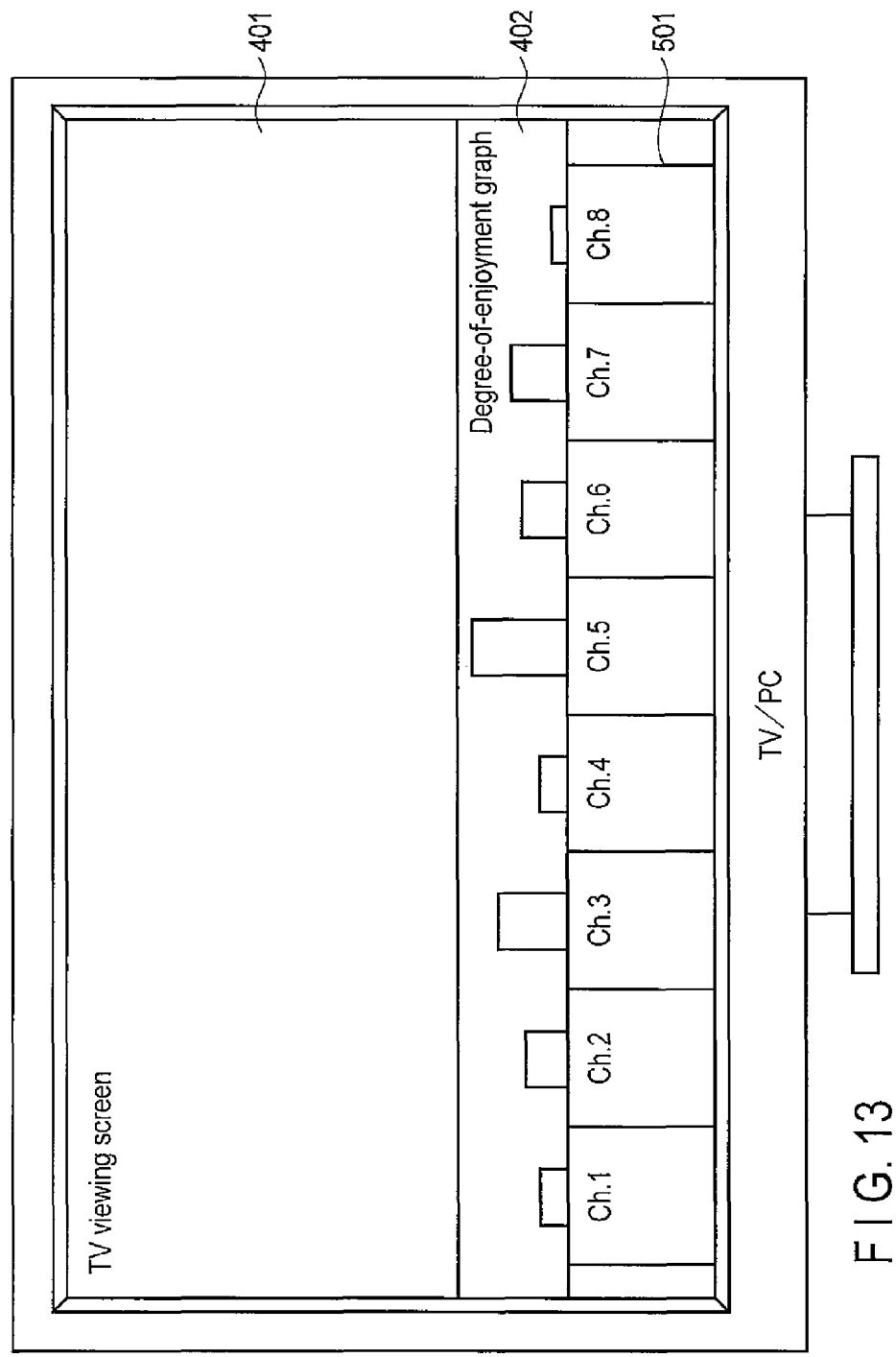
FIG. 13 is a diagram illustrating still another example of the display screen of the client terminal in FIG. 9.

FIG. 13 is a fourth display screen example. The fourth display screen example is applied to PC or TV. In FIG. 13, the TV viewing screen 401 and a program guide 501 are displayed on the display screen of PC or TV. The degree-of-enjoyment graph 402 is further displayed above the program guide 501. The program guide 501 displays a guide to program data for each channel. Above the guide to the program data for each channel, a graph (bar) showing the degree of enjoyment for the channel is displayed. By looking at the degree-of-enjoyment graph 402 and the program guide 501, the user can know channels with higher degrees of enjoyment and a summary of the program data for the channels.

Figure 14:
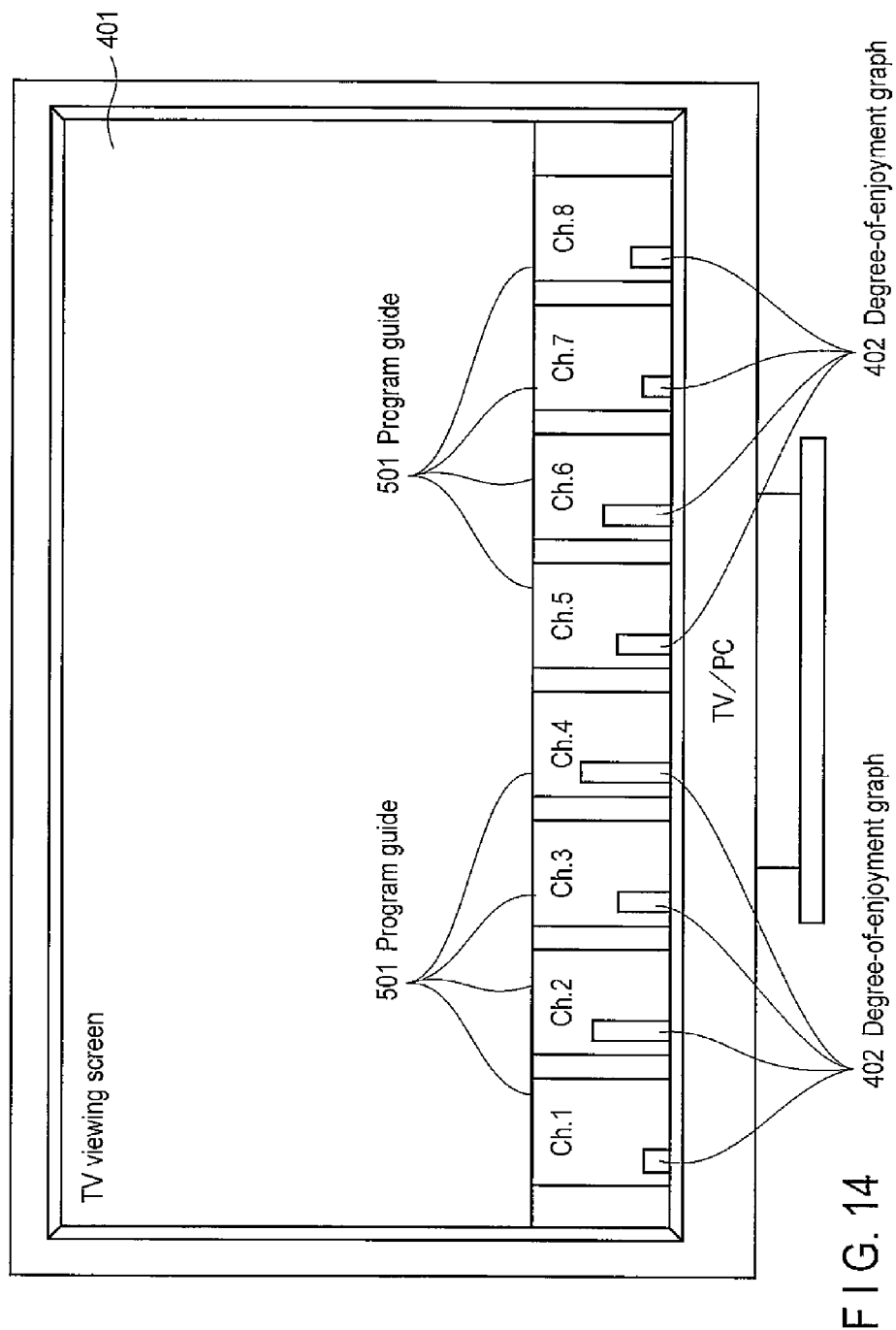
FIG. 14 is a diagram illustrating further another example of the display screen of the client terminal in FIG. 9.

FIG. 14 is a fifth display screen example. The fifth display screen example is applied to PC or TV. In FIG. 14, the degree-of-enjoyment graph 402 is displayed in the program guide 501. That is, on an area showing the guide to program data for each channel, a graph (bar) showing the degree of enjoyment for the channel is displayed.

Figure 15:
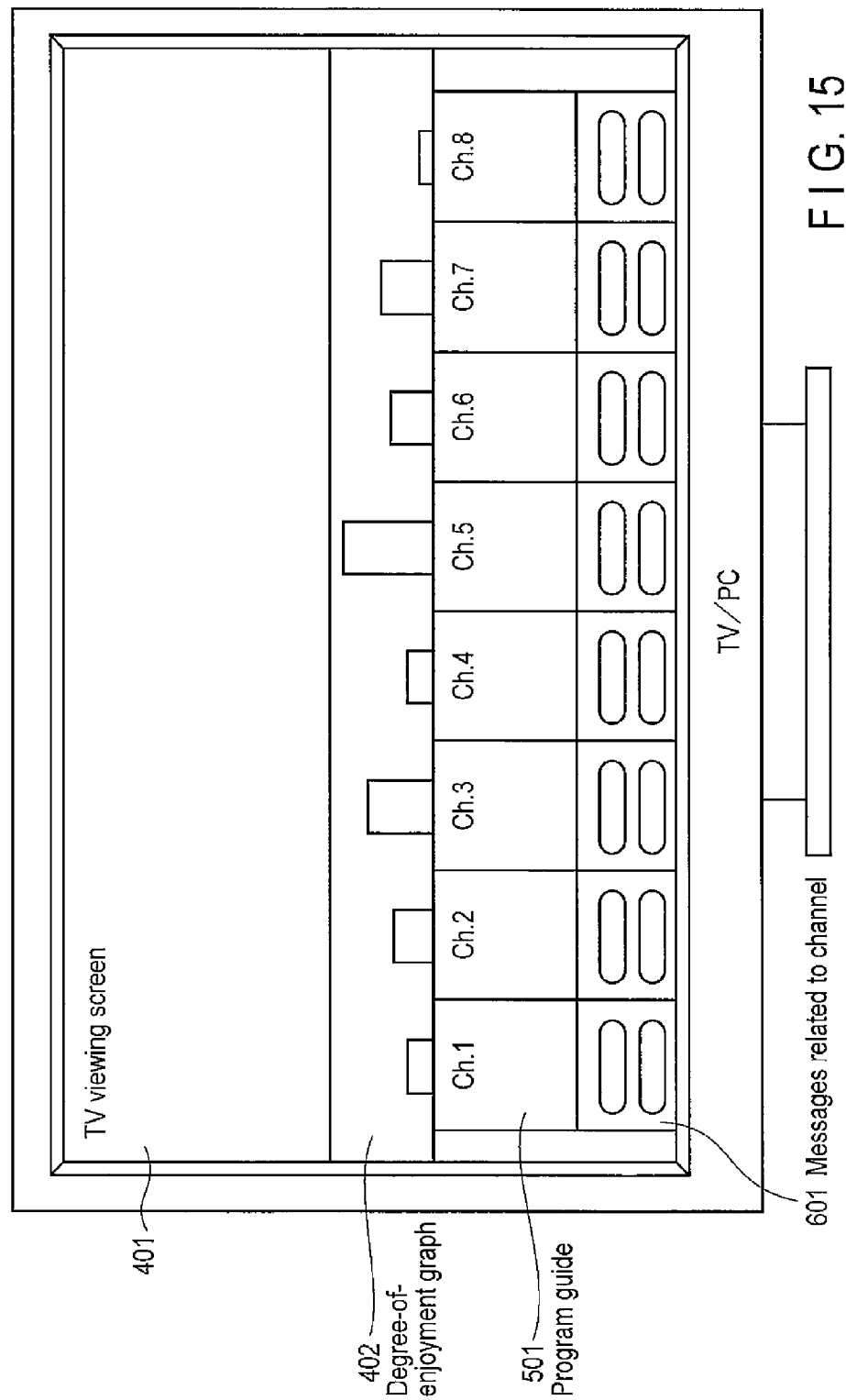
FIG. 15 is a diagram illustrating still yet another example of the display screen of the client terminal in FIG. 9.

FIG. 15 is a sixth display screen example. The sixth display screen example is applied to PC or TV. In FIG. 15, the TV viewing screen 401 and the program guide 501 are displayed on the display screen of PC or TV. The degree-of-enjoyment graph 402 is further displayed above the program guide 501. The program guide 501 displays the guide to the program data for each channel. Above the guide to the program data for each channel, the graph (bar) showing the degree of enjoyment for the channel is displayed. Moreover, a message list 601 is displayed below the program guide 501. That is, below the guide to the program data of each channel, the contents of a few most recent messages related to this channel are displayed.

The display control of the degree-of-enjoyment graph 402 may be performed by a processor in the client terminal 10. The processor generates a degree-of-enjoyment graph 402 based on the evaluation values for the respective channels received from the enjoyment analysis server 2. The processor then displays the degree-of-enjoyment graph 402 on the screen.

As described above, according to the present embodiment, messages related to a certain broadcast station and posted on the site (SNS site) on the Internet are each received from the SNS site. Each of the messages is scored so as to give a higher score to messages each with a smaller number of characters. Based on the scores for the respective messages, the evaluation value (the degree of enjoyment) for the above-described broadcast station is calculated. The calculated evaluation value is then transmitted to the user terminal (client terminal 10). Since a message with smaller number of characters is given a higher score, even if the total number of message is small, the client terminal can be provided with the evaluation value indicative of the viewers' reactions to the content data being broadcast, specifically, the degree of enjoyment on the SNS site for the content data being broadcast.

Furthermore, the present embodiment uses the upper limit on the number of characters specified by a service such as SNS, as the upper limit value of the number of characters. Thus, while programs are being broadcast, a reference value for allowing messages to be easily scored can be determined without the need for a statistical process for determining the maximum value of the number of characters in each message.

In the description of the present embodiment, messages are collected from one SNS. However, messages may be collected from a plurality of SNSs of different types. The message collection unit 3 may maintain the connection between the SNS server 1 and the enjoyment analysis server 2 using HTTP and an expanded function such as WebSocket, thus continuously acquiring new messages from the SNS site.

Furthermore, if the message collection unit 3 collects messages from a plurality of different SNSs, the enjoyment analysis unit 7 may use, as the upper limit value of the number of characters that can be posted, the smallest or largest one of the upper limit values specified by the target SNSs for collection, or an optionally set value.

The enjoyment distribution unit 9 may maintain connections with the client terminals using HTTP and an expanded function such as WebSocket, and transmit analysis results to the client terminals at given intervals (push type distribution).

In counting the number of characters in each message, the enjoyment analysis unit 7 may exclude the number of characters in some particular strings such as URL, a user name, and the hash tag which are contained in the message. In this case, the number of characters used to score a message is a value obtained by subtracting the number of characters in the particular strings from the total number of characters in the message.

Furthermore, the procedure for the enjoyment analysis function according to the present embodiment may all be carried out by software. Thus, effects similar to those of the present embodiment can be easily achieved simply by installing a computer program carrying out the procedure, in a normal computer via a computer readable storage medium in which the program is stored, and then executing the program.

The various modules of the embodiments described herein can be implemented as software applications, hardware and/ or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
a receiver device of a broadcast analysis system configured to receive, from a site on the Internet, a first set of messages related to a first broadcast station, the first set of messages posted on the site respectively by users; and
a processor device of the broadcast analysis system configured to score at least a first message from the first set of messages, wherein the messages from the first set of messages comprise characters, the score is, at least in part, calculated based on a number of characters in the first message from the first set of messages and the score increases inversely to a number of characters in the first message from the first set of messages, wherein a higher scored message comprises less characters than a lower scored message, and the processor device is further configured to calculate a first evaluation value for content data being broadcast by the first broadcast station based on scores for the first set of messages,
wherein the receiver device is further configured to receive, from the site, a second set of messages related to a second broadcast station, the second set of messages posted on the site respectively by the users,
wherein the processor device is further configured to score at least a first message from the second set of messages, wherein the messages from the second set of messages comprise characters, the score is, at least in part, calculated based on a number of characters in the first message from the second set of messages and the score increases inversely to a number of characters in the first message from the second set of messages, the processor further configured to calculate a second evaluation value for content data being broadcast by the second broadcast station based on scores for the second set of messages, and
wherein the broadcast analysis system provides the first evaluation value and the second evaluation value to a user device for display to a user.

2. The system of claim 1,
wherein the processor device is further configured to calculate a difference between an upper limit value of the number of characters capable of being posted on the site per message and the number of characters in the first message from the first set of messages, and to determine a sum of the calculated differences for the first set of messages as the first evaluation value.

3. The system of claim 1,
wherein the processor device is further configured to calculate a difference between an upper limit value of the number of characters capable of being posted on the site per message and the number of characters the first message from the second set of messages, and to determine a sum of the calculated differences for the second set of messages as the second evaluation value.

4. The system of claim 1,
wherein the site on the Internet is a site for a social networking service.

5. A method of providing information, the method comprising:
receiving at a broadcast analysis system computer hardware, from a site on the Internet, a first set of messages related to a first broadcast station, the first set of messages posted on the site respectively by users;
scoring, by the broadcast analysis system, at least a first message from the first set of messages, wherein the messages from the first set of messages comprise characters, the score is, at least in part, calculated based on a number of characters in the first message from the first set of messages and the score increases inversely to a number of characters in the first message from the first set of messages, wherein a higher scored message comprises less characters than a lower scored message;
calculating a first evaluation value for content data broadcast by the first broadcast station based on scores for the first set of messages;
receiving at the broadcast analysis system, from the site, a second set of messages related to a second broadcast station, the second set of messages posted on the site respectively by the users;
scoring, by the broadcast analysis system, at least a first message from the second set of messages, wherein the messages from the second set of messages comprise characters, the score is, at least in part, calculated based on a number of characters in the first message from the second set of messages and the score increases inversely to a number of characters in the first message from the second set of messages;
calculating a second evaluation value for content data being broadcast by the second broadcast station based on scores for the second set of messages; and
providing the first evaluation value and the second evaluation value to a user device for display to a user.

6. The method of claim 5, wherein
the scoring comprises:
calculating a difference between an upper limit value of the number of characters capable of being posted on the site per message and the number of characters in the first message from the first set of messages, and determining a sum of the calculated differences for the first set of messages as the first evaluation value.

7. The method of claim 5, wherein
the scoring comprises:
calculating a difference between an upper limit value of the number of characters capable of being posted on the site per message and the number of characters in a first message from the second set of messages; and
determining a sum of the calculated differences for the second set of messages as the second evaluation value.

8. The method of claim 5, wherein the site on the Internet is a site for a social networking service.

9. A computer-readable, non-transitory storage medium having stored thereon a computer program which is executable by a computer, the computer program controlling the computer to execute the functions of:
receiving, from a site on the Internet, a first set of messages related to a first broadcast station, the first set of messages posted on the site respectively by users;

scoring at least a first message from the first set of messages, wherein the messages from the first set of messages comprise characters, the score is, at least in part, calculated based on a number of characters in the first message from the first set of messages and the score increases inversely to a number of characters in the first message from the first set of messages, wherein a higher scored message comprises less characters than a lower scored message;

calculating a first evaluation value for content data broadcast by the first broadcast station based on scores for the first set of messages;

receiving, from the site, a second set of messages related to a second broadcast station, the second set of messages posted on the site respectively by the users;

scoring at least a first message from the second set of messages, wherein the messages from the second set of messages comprise characters, the score is, at least in part, calculated based on a number of characters in the first message from the second set of messages and the score increases inversely to a number of characters in the first message from the second set of messages;

calculating a second evaluation value for content data being broadcast b the second broadcast station based on scores for the second set of messages; and providing the first evaluation value and the second evaluation value to a user device for display to a user.

10. The computer-readable, non-transitory storage medium of claim 9, wherein
the scoring comprises:
calculating a difference between an upper limit value of the number of characters capable of being posted on the site per message and the number of characters in a first message from the first set of messages; and
determining a sum of the calculated differences for the first set of messages as the first evaluation value.

11. The computer-readable, non-transitory storage medium of claim 9, wherein
the scoring comprises:
calculating a difference between an upper limit value of the number of characters capable of being posted on the site per message and the number of characters in a first message from the second set of messages; and
determining a sum of the calculated differences for the second set of messages as the second evaluation value.

12. The computer-readable, non-transitory storage medium of claim 9, wherein the site on the Internet is a site for a social networking service.

* * * * *